(12) United States Patent
Kemmer et al.

(10) Patent No.: US 7,917,467 B2
(45) Date of Patent: Mar. 29, 2011

(54) PROCESSING OF DATA SETS IN A COMPUTER NETWORK

(75) Inventors: Johann Kemmer, Muehlhausen (DE); Andrei Jadanovski, Schwaebisch Hall (DE); Paola Sala, Heidelberg (DE); Erwin Pinter, Neuhofen (DE); Oleg Shestakov, Eppelheim (DE)

(73) Assignee: SAP Ag, Walldorf (DE)

( * ) Notice: Subject to any disclaimer, the term of this patent is extended or adjusted under 35 U.S.C. 154(b) by 1826 days.

(21) Appl. No.: 10/871,187

(22) Filed: Jun. 18, 2004

(65) Prior Publication Data

US 2005/0283455 A1 Dec. 22, 2005

(51) Int. Cl.
*G06F 7/00* (2006.01)

(52) U.S. Cl. .......... 707/609; 707/705; 707/802; 705/26; 705/27; 705/37

(58) Field of Classification Search .................. None
See application file for complete search history.

(56) References Cited

U.S. PATENT DOCUMENTS

| | | | |
|---|---|---|---|
| 5,317,636 A * | 5/1994 | Vizcaino | 705/65 |
| 6,199,079 B1 * | 3/2001 | Gupta et al. | 715/507 |
| 6,629,079 B1 * | 9/2003 | Spiegel et al. | 705/26 |
| 6,801,915 B1 * | 10/2004 | Mack | 707/100 |
| 7,213,023 B2 * | 5/2007 | Hadzikadic | 707/100 |
| 2002/0010664 A1 * | 1/2002 | Rabideau et al. | 705/30 |
| 2002/0026374 A1 * | 2/2002 | Moneymaker et al. | 705/26 |
| 2002/0052829 A1 * | 5/2002 | Boutilier et al. | 705/37 |
| 2002/0184402 A1 * | 12/2002 | Gangopadhyay | 709/315 |
| 2002/0198995 A1 * | 12/2002 | Liu et al. | 709/226 |
| 2003/0036940 A1 | 2/2003 | Leymann et al. | |
| 2003/0139918 A1 * | 7/2003 | Hardwick et al. | 703/22 |
| 2003/0149604 A1 | 8/2003 | Casati et al. | |

OTHER PUBLICATIONS

SAP Enterprise Buyer Release Notes 4.0, SAP Release Notes, Feb. 2, 2004, 49 pages.

* cited by examiner

*Primary Examiner* — Debbie Le
*Assistant Examiner* — Hasanul Mobin
(74) *Attorney, Agent, or Firm* — Finnegan, Henderson, Farabow, Garrett & Dunner LLP (57) ABSTRACT

A system and method for the resource-saving collaborative handling of data sets in a computer network is described. The method comprises the steps of providing a data set having an initial collaborative workflow, determining if the data set satisfies a set of one or more first start conditions to trigger a random function query, providing the data set to a random function if the random function query is triggered, stochastically determining, by the random function, whether or not to assign a modified collaborative workflow to the data set, and replacing the initial workflow with the modified workflow for the data set if the random function determines to assign the modified workflow.

24 Claims, 8 Drawing Sheets

| START CONDITIONS 1 | MODIFIED WORKFLOW 1 | STOCHASTIC PARAMETERS 1 |
|---|---|---|
| START CONDITIONS 2 | MODIFIED WORKFLOW 2 | STOCHASTIC PARAMETERS 2 |
| START CONDITIONS 3 | MODIFIED WORKFLOW 1 | STOCHASTIC PARAMETERS 3 |
| START CONDITIONS 4 | MODIFIED WORKFLOW 1 | STOCHASTIC PARAMETERS 2 |
| START CONDITIONS 5 | MODIFIED WORKFLOW 2 | STOCHASTIC PARAMETERS 4 |

PROCESSING OF DATA SETS IN A COMPUTER NETWORK

DESCRIPTION OF THE INVENTION

1. Field of the Invention

The invention relates to the processing of one or more data sets in a computer network. More specifically, the invention relates to the processing of data sets in a collaborative workflow.

2. Background of the Invention

Data set-related processes commonly transverse a plurality of stages, such as processing, storing, review and transmission stages, typically defined in the form of a workflow. Transitions from one workflow stage to another may be accompanied by the generation or modification of status information specific for a particular transition and indicative of the current workflow stage. The transition from one workflow stage to another may be initiated automatically or by automated dialogue-type communications.

The computer-assisted procurement of goods and services or the computer-assisted manufacturing of complex machinery are typical examples of multi-stage data set-related processes. During a procurement process, for example, data pertaining to different collaborative processing steps, such as purchase requisitions, goods ordering, goods receipt and invoicing, are successively generated and have to be successively stored, processed and confirmed. Hence, individual data sets or data set states associated with the individual processing steps will have to be handled as the procurement process proceeds.

As complex collaborative processes necessitate the interaction of a plurality of users, software mechanisms handling the generation, storage and manipulation of process-related data sets typically operate on distributed components of a computer network. This requirement implies that individual data sets will be accessed from different network components at different workflow stages.

A problem addressed by the present invention is that when a data set is subjected to a collaborative workflow and waiting to be checked and approved or rejected by a review intervention, this data set may be identified as "waiting" for review. Such waiting periods considerably lengthen the duration of the entire workflow. Another problem is that during (or waiting for) the review intervention, such a data set may not be accessible by other network components to ensure data integrity. This restriction results in other users experiencing an access delay which, depending on the specific situation, can range from several seconds to several hours or days. Such access delays are disruptive in scenarios of the above kind where several stages have to be traversed before the workflow is completed, and particularly in arrangements that involve numerous collaborative users, workflow stages, and processes running in parallel.

A further problem addressed by the invention is the automatic association of a particular data set with the appropriate collaborative workflow. Usually, complex start conditions have to be specified and evaluated to determine the particular workflow matching the peculiarities of a particular data set. It is self evident that this determination becomes increasingly error-prone (and thus often requires undesirable human interaction) as the complexity of the start conditions increases.

A still further problem addressed by the invention is the generally high network traffic associated with collaborative workflows.

It is an object of the present invention to enable an efficient handling of large numbers of data sets in a collaborative workflow scenario as described above. More particularly, it is an object of the present invention to provide an approach that enables an automatic and standardized processing of large numbers of data sets and ensures an accelerated processing thereof while at the same time providing a consistently high quality work product.

SUMMARY OF THE INVENTION

According to one aspect of the invention, a method of handling a data set subjected to one or more stages of a collaborative workflow executed in a computer network connecting a plurality of computer network components is provided, wherein the collaborative workflow relates to a manipulation of status information associated with the data set and the status information controls the processing of at least one of the data set itself and of an associated data set. The method comprises the steps of providing a data set having an initial workflow, determining if the data set satisfies a set of one or more first start conditions to trigger a random function query, providing the data set to a random function if the random function query is triggered, stochastically determining, by the random function, whether or not to assign a modified workflow to the data set, and replacing the initial workflow with the modified workflow for the data set if the random function determines to assign the modified workflow.

Combining suitably selected start conditions with a stochastic workflow replacement mechanism provides the basis for a plurality of technical advantages, such as reduced access delays, reduced network traffic and a smoother transmission between individual workflow stages. The implementation of the stochastic process reduces, on the average, the occupied processing and network resources compared with conventional workflow scenarios.

The modified workflow that is to replace the initial workflow may be selected out of a predefined set of workflows. The initial workflow may also be selected out of this predefined workflow set or out of a separate predefined set of initial workflows. Selection of the modified workflow may be performed in dependence on the set of first start conditions satisfied by the data set. In a similar manner the initial workflow may be selected in dependence on a set of second start conditions satisfied by the data set. The first and second start conditions may be defined such that the first start conditions are narrower than the second start conditions. In many cases this helps to simplify and accelerate the definition, evaluation and maintenance of the second start conditions. Due to the simplified second start conditions, the selection of the initial workflow can be accelerated and becomes more stable and less error-prone.

The first start conditions evaluated in context with the triggering of the random function query may relate to at least one of the initial workflow, a threshold value, a workflow event, a data set type and data set sub-type. Accordingly, the necessity of stochastically initiating a modified workflow may, for example, depend on the type of the workflow initially assigned to the data set (i.e., the initial workflow). Alternatively, or additionally, one or more numerical parameters included in the data set may be compared with one or more corresponding threshold values. The second start conditions may relate to the data set type and/or sub-type. Preferably, the second start conditions do not relate to a threshold value.

Each set of first start conditions may be associated with one or more stochastic parameters that control the stochastic determination process. The stochastic parameters may, for example, include control values that influence the probability with which the initial workflow will be replaced with a modified workflow. According to one variant of the invention, a stochastic parameter in the form of a percentage value may be defined.

The one or more stochastic parameters that control the stochastic determination process may be automatically adjusted. According to one embodiment of the invention, the number of workflow replacements (for example per predefined time interval) may be monitored and the one or more stochastic parameters may be adjusted in dependence on the number of workflow replacements. This adjustment can be performed such that a predefined number of workflow replacements is attained.

Each data set may be associated with a stochastic identifier. The stochastic identifier may take the form of a flag or the like and may be provided for the purpose of controlling the process of subjecting the data set to the random function. The stochastic identifier may be manipulated (e.g., set, changed, etc.) if the data set satisfies one set of first start conditions. This manipulation may be performed such that a control routine recognizes the manipulation and, as a result of the recognition, subjects the data set to the random function.

As has initially been mentioned, the (initial or modified) workflow may include a manipulation of status information associated with the data set. The status information may be manipulated fully automatically. Alternatively, the status information may be manipulated semi-automatically in response to dialogue-type communication.

The status information may relate, for example, to a particular processing status of the data set (or processing stage of the workflow). Alternatively, or additionally, the status information may be indicative of the state or the result of a review intervention (e.g., an approval) or any other automatic, or automated dialogue-type, intervention. The status information may automatically be evaluated for the purpose of controlling the further processing (including sending, deleting, etc.) of the data set itself and/or of a follow-on data set associated with the data set that is subjected to the collaborative workflow.

According to one embodiment, the initial workflow includes an automatic manipulation of the status information. Thus, the initial workflow may not require any dialogue-type intervention and can therefore be concluded very rapidly. The automatic manipulation of the status information allows in many cases to refrain from routing the data set to other network components for status manipulation purposes. Accordingly, no network traffic may occur during the initial workflow (or network traffic can at least be reduced).

The modified workflow may include the step of routing the data set (or parts thereof) to one or more network addresses. The data set may be sent together with a status manipulation request that prompts the receiving network component to automatically initiate a status manipulation process as mentioned above.

Each (initial or modified) workflow may precede and/or control the generation of a follow-on data set for the data set subjected to this workflow. The follow-on data set may be attached or related to the initial data set.

The individual workflows and in particular the initial workflow on the one hand and the modified workflows on the other hand may differ in the number of routing processes included in the workflows. Whereas, for example, the initial workflow may include no or only one routing process, one or more of the modified workflows may include one, two or more such routing processes. This means that the initial workflow may generally cause less network traffic than the modified workflows. Such an approach is advantageous if the initial workflow is statistically performed more often than the modified workflows (depending on the stochastic determination process). If, however, the modified workflows are statistically performed more often then the initial workflow, the modified workflows may include less routing processes than the initial workflow. Additionally, or alternatively, the individual workflows may differ in the network addresses to which the data sets or parts thereof are routed.

The invention may be practiced as a software solution, as a hardware solution or as a combination thereof. As regards a software solution, the invention relates to computer program product comprising program code portions for performing the steps of the invention when the computer program product is run on one or more computer network components or computer systems. The computer program product may be stored on a computer readable recording medium.

As regards a hardware solution, a computer network component for controlling the handling of a data set that will be subjected to one or more stages of a collaborative workflow executed in a computer network connecting a plurality of computer network components is provided, wherein the collaborative workflow relates to a manipulation of status information associated with the data set and wherein the status information controls the processing of at least one of the data set itself and of an associated data set. The network component comprises a provision unit for providing a data set having an initial workflow, a determination unit for determining if the data set satisfies a set of one or more start conditions to trigger a random function query and for providing the data set to a random function unit if the random function query is triggered, a random function unit for stochastically determining whether or not to assign a modified workflow to the data set, and a replacement unit for replacing the initial workflow with the modified workflow for the data set if the random function determines to assign the modified workflow.

According to a further aspect of the invention a computer network comprising the above computer network component as well as a plurality of further computer components is provided, wherein the data set or a part thereof is sent to one or more of the computer network components as specified by the workflow that has been assigned to the data set in dependency on the set of start conditions satisfied by the data set and, if involved, in dependency on the stochastic determination of the random function unit.

It will be appreciated that the present invention provides a distributed status manipulation control for data sets. This flexible control simplifies the conditions that have to be satisfied to initiate a workflow, and enhances the effectiveness of the overall process by reducing network traffic and workload associated with status manipulation processes. The present invention accomplishes these benefits while maintaining a high level of control and review over the workflow.

BRIEF DESCRIPTION OF THE DRAWINGS

Further details, embodiments, modifications and enhancements of the present invention may be obtained from consideration of the following description of various illustrative embodiments of the invention in conjunction with the drawings, in which.

DETAILED DESCRIPTION OF PREFERRED EMBODIMENTS

In the following description, for purposes of explanation and not limitation, specific details are set forth, such as particular data formats and processes utilized in connection therewith in order to provide a thorough understanding of the present invention. It will be apparent to one skilled in the art that the present invention may be practiced in other embodiments that depart from these specific details. In particular, while the different embodiments described herein below are incorporated into or used in conjunction with particular types of multi-stage workflows, it will be appreciated by the skilled artisan that the present invention is applicable to a wide variety of workflows having at least some criteria requiring manipulation of status information. Where appropriate, the same reference numbers will be used throughout this detailed description in conjunction with the drawings to refer to the same or like parts.

Figure 1:
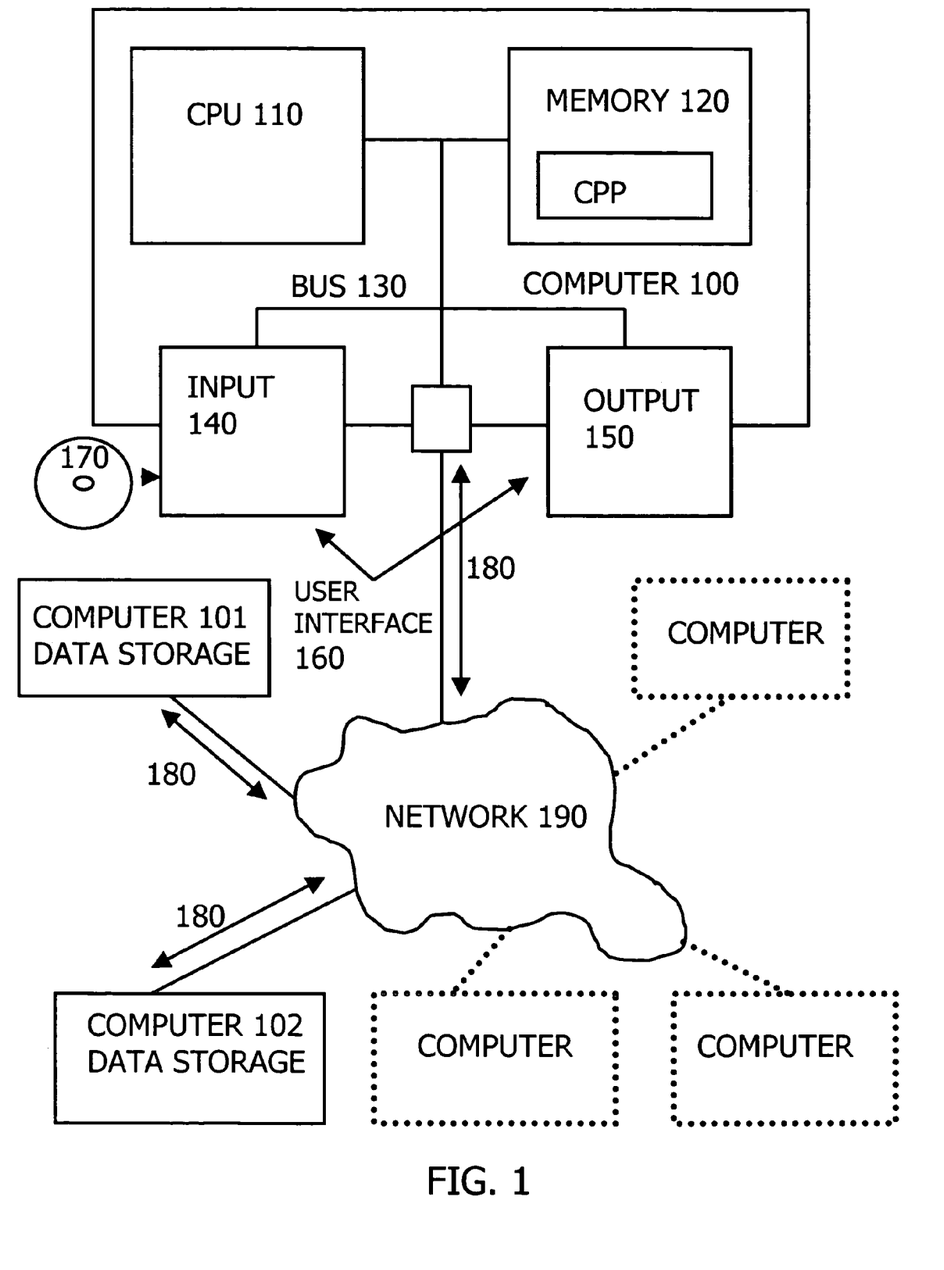
FIG. 1 is a schematic diagram illustrating the data processing system used in accordance with the present invention.

FIG. 1 illustrates a simplified block diagram of a computer network system according to the present invention having a plurality of distributed computer network components 100, 101, 102 that are coupled via a network 190. The network components 100, 101, 102 may be realized, for example, as clients, servers, routers, peer devices or any other common network devices.

Each network component 100, 101, 102 comprises a processor 110, a memory 120, a bus 130, and, optionally, one or more input devices 140 and output devices 150 (I/O devices) acting as a user interface 160, coupled and operating together in a conventionally known manner. The present invention may be embodied in a computer program product (hereinafter CPP) residing on a program carrier 170 and/or in the memory 120, and generating program signals 180, collectively called a "program".

The network components 101, 102, which are also referred to as "remote computers", typically may comprise many or all of the elements described with respect to the network component 100. Hence, the elements 110 to 180 in the network component 100 collectively illustrate corresponding elements that may be found within the other network components 101, 102 of the network 190.

The network component 100 can be, for example, a conventional personal computer (PC), a desktop or a hand-held device, a multiprocessor computer, a microprocessor-based or programmable consumer electronics device, a minicomputer, a mainframe computer, a personal mobile computing device, a mobile communications device, a portable or stationary personal computer, a palmtop computer or the like.

The processor 110 can be, for example, a central processing unit (CPU), a micro-controller unit (MCU), a digital signal processor (DSP), or the like.

The memory 120 symbolizes elements or components that can temporarily or permanently store data and instructions. Although the memory 120 is conveniently illustrated as a part of the network component 100, a memory function can also be implemented as an independent node in the network 190, in the other components of the network, in the processor 110 itself (e.g., cache, register), or elsewhere. The memory 120 can be a read only memory (ROM), a random access memory (RAM), or a memory with other access options or capabilities. The memory 120 may be physically implemented as machine-accessible media, such as a magnetic media (like a hard disk, a floppy disk, or other magnetic disk, or a tape), an optical media (like an optical disk, e.g. a CD-ROM or a digital versatile disk—DVD), a semiconductor media (like DRAM, SRAM, EPROM, EEPROM, or a memory stick), or by any other media. Optionally, the memory 120 is distributed across different media. Portions of the memory 120 can be removable or non-removable with respect to a particular network component. For reading from media and for writing into media, the network component 100 uses devices well known in the art such as, for example, disk drives, tape drives, memory card or memory stick reader/writers, etc.

The memory 120 can store software program support modules such as, for example, a basic input output system (BIOS), an operating system (OS), a program library, a compiler, an interpreter, communication programs, drivers, protocol converters, application software programs like text processors, (Internet-) browsers, or database applications. Although the CPP is illustrated as being stored in memory 120, the CPP can also be located elsewhere. For example, the CPP can also be embodied on the program carrier 170.

The CPP comprises program instructions and, optionally, data or variables that cause processor 110 to execute the steps forming the methodology of the present invention. The method steps are explained in greater detail below. The CPP defines and controls the operation of the network component 100 and its interaction in the network system 190. For example, and without the intention to be limiting, the CPP can be available as source code in any programming language, and as object code ("binary code") in a compiled presentation. Persons of ordinary skill in the art can use the CPP in connection with any of the above mentioned support modules. The functionalities of one or more of the network components 100, 101, 102 and of the CPP are closely related. Phrases, such as "the computer provides" or "the program provides", are used hereinafter to express actions by one or more network nodes that is/are controlled by the CPP in accordance with the invention.

The program carrier 170 is illustrated as being outside the network component 100. For communicating the CPP to the network component 100, the program carrier 170 is conveniently inserted into the input device 140. The carrier 170 is implemented as any computer readable medium, such as one of the media explained above (cf. memory 120). Generally, the program carrier 170 is an article of manufacture comprising a computer readable medium having computer readable program code portions embodied therein for executing the method of the present invention. Further, the program signals 180 can also embody the CPP. The signals 180 travel on the computer network 190 to and from the network component 100. The steps of the computer program product CPP can be executed solely in the network component 100, in which case the computer network 190 may be omitted, or can be executed in a distributed manner in one or more of the components of the computer network 190.

The input device 140 is a device that provides data and instructions for being processed by the network component 100. For example, the device 140 can be a keyboard, a pointing device (e.g., a mouse, a trackball, cursor direction keys), a microphone, a joystick, a game pad, a scanner, etc. While these examples are devices requiring human interaction, the device 140 can also operate without human interaction, such as a wireless receiver (e.g., with satellite dish or terrestrial antenna), a sensor, a counter (e.g., goods counter in a factory), etc. The input device 140 can also serve to retrieve the program code of the CPP from the program carrier 170.

The output device 150 is a device that presents instructions and data that have been processed. It can be, for example, a monitor or display (such as a cathode ray tube, a flat panel display, or a liquid crystal display), a speaker, a printer, a plotter, a vibration alert device, etc. or a combination thereof. Similar to the input device 140, the output device 150 mainly communicates with the user(s), but it can also communicate with further network components or devices. The input device 140 and the output device 150 can be combined into a single device.

The bus 130 and the computer network 190 provide logical and physical connections by conveying instructions and data signals. While connections and communications inside the network component 100 are conveniently handled by the bus 130, connections and communications between different network components are handled by the network 190. Optionally, the network 190 comprises gateways and routers being computers that are dedicatedly programmed to effect data transmission and protocol conversion.

The input/output devices 140 and 150 are coupled to the network component 100 by the bus 130 (as illustrated) or by the network 190 (optional). While the signals inside the network component 100 can be mostly electrical signals, the signals in the network can be electrical, magnetic, optical, or wireless (radio) signals.

The network 190 can include one or more of an office-wide computer network, an enterprise-wide computer network, an intranet or the Internet (i.e., the world wide web). The world wide web (www) represents all of the computers on the Internet that offer users access to information on the Internet via interactive documents or Web pages. Web information resides on Web servers on the Internet or within company or community networks (intranets). The network 190 can include a wired or a wireless network, such as, for example, a local area network (LAN), a wide area network (WAN), a wireless LAN (WLAN), a public switched telephone network (PSTN), an integrated services digital network (ISDN), an infra-red (IR) or Bluetooth link, a radio link e.g. according to the Universal Mobile Telecommunications System (UMTS), the Global System for Mobile Communication (GSM), a Code Division Multiple Access (CDMA) system, or satellite link.

Transmission protocols, mechanisms and data formats to effect communications between network components which are connected to and by the network 190 are known, for example, as transmission control protocol/internet protocol (TCP/IP), hyper text transfer protocol (HTTP), secure HTTP, wireless application protocol (WAP), unique resource locator (URL), unique resource identifier (URI), hyper text markup language HTML, extensible markup language (XML), extensible hyper text markup language (XHTML), wireless application markup language (WML), electronic data interchange (EDI), which is an electronic exchange of business information between or inside organizations and their information technology (IT) infrastructure in a structured format, remote function call (RFC), or via an application programming interface (API), etc.

Interfaces coupled between individual elements and components are also well known in the art. For simplicity, interfaces are not illustrated. An interface can be, for example, a serial port interface, a parallel port interface, a game port, a universal serial bus (USB) interface, an internal or external modem, a video adapter, or a sound card.

The software and the hardware infrastructure of an embodiment of the invention utilize the network component 100 having the graphical display unit 150 and the input unit 140, e.g. a mouse or a trackball. The network component 100 is connected to a wide area network (WAN) 190, for operating in an intranet and for providing access to the Internet to which a number of members of a group of the similar or identical network components 101, 102 are also connected. In order to operate the CPP according to the invention, one of the network components 101, 102 acts as a host server having an archival data storage for access by the group. In addition to its server tasks, the host server may also provide firewall functions, authenticate the distributed client components connected to the computer network 190, and provide other similar functionality.

The CPP according to the present invention can be part of a complex software system embedded in a hardware structure. The cooperation of the software system and the hardware structure is sometimes referred to as IT backbone system. The backbone system can have a layered structure with individual software components acting in accordance with the client/server concept as service providers, service requesters, or both. For example, application software can include software components that provide services for presentation, acting as a server. But at the same time, the application software also can act as service requester of database services provided by a lower layer. The layered components can communicate with each other via predefined (hardware and software) interfaces.

With regard to a possible implementation of a layered software structure, a lower layer may include network-related functionalities, a physical database and an operating system for the network components. A middle layer that interfaces with the lower layer integrates software applications in the upper layer above it. This middle layer may include components like software tools, system administration tools, data handling tools, authorization and security management tools, cross-application modules, and a system kernel. The system kernel can use communications and application program interfaces to access components like application software in the upper layer or the operating system, the database, and the network in the lower layer. This system kernel can operate independently from the applications and is located "under" the application software and the data layers of the software system. The upper layer contains the different software applications (e.g., for controlling and monitoring processes relating for example to the management of human resources, sales and distribution, financials, materials, manufacturing, etc.).

One possible client/server configuration in which the present invention can be carried out is the so-called three-tiered architecture which separates a network system's components into three functional groups: presentation, application, and database. This is illustrated in FIG. 2 in a hardware-related view.

Figure 2:
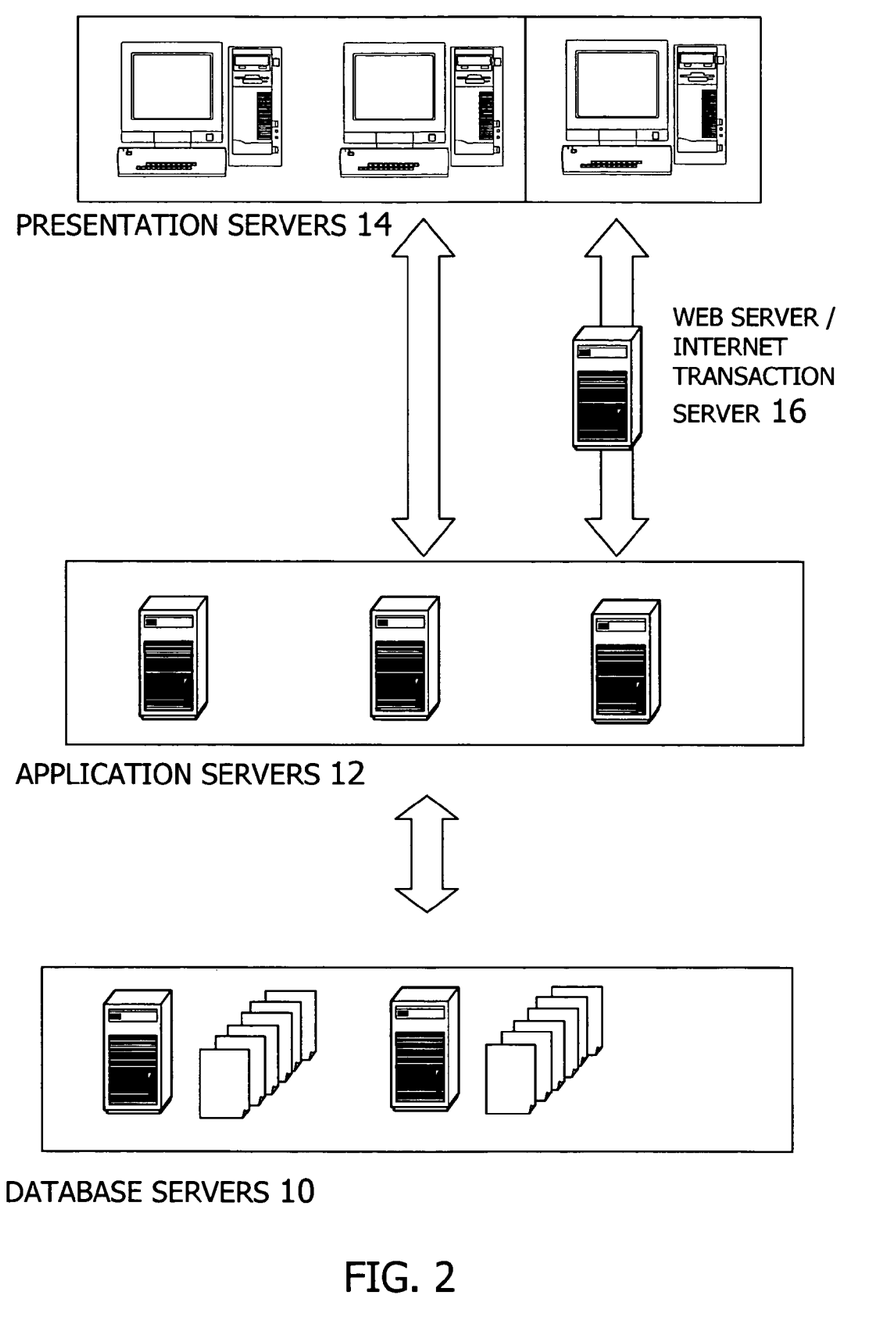
FIG. 2 is a schematic diagram illustrating a hardware-oriented view of a three-tiered client/server configuration of the system depicted in FIG. 1.

With the three-tiered architecture shown in FIG. 2, each hardware group is configured to support demands of its functions. The one or more database servers 10 contain the databases. Application servers 12 interfacing the database servers 10 include the processing logic of the system with services such as spooling, dispatching user requests, and formatting data. The tasks related to the presentation of data are handled by presentation servers 14, which are typically personal computers or workstations, enabling easy access to the system. External presentation servers 14 may be connected to the application servers 12 via the Internet and a web server/Internet transaction server 16. Communication among the three tiers can be accomplished with the use of standard protocol services mentioned above, such as the ones provided by TCP/IP or CPIC. CPIC stands for Common Programming Interface Communication and includes standard functions and services for program-to-program communication.

Figure 3:
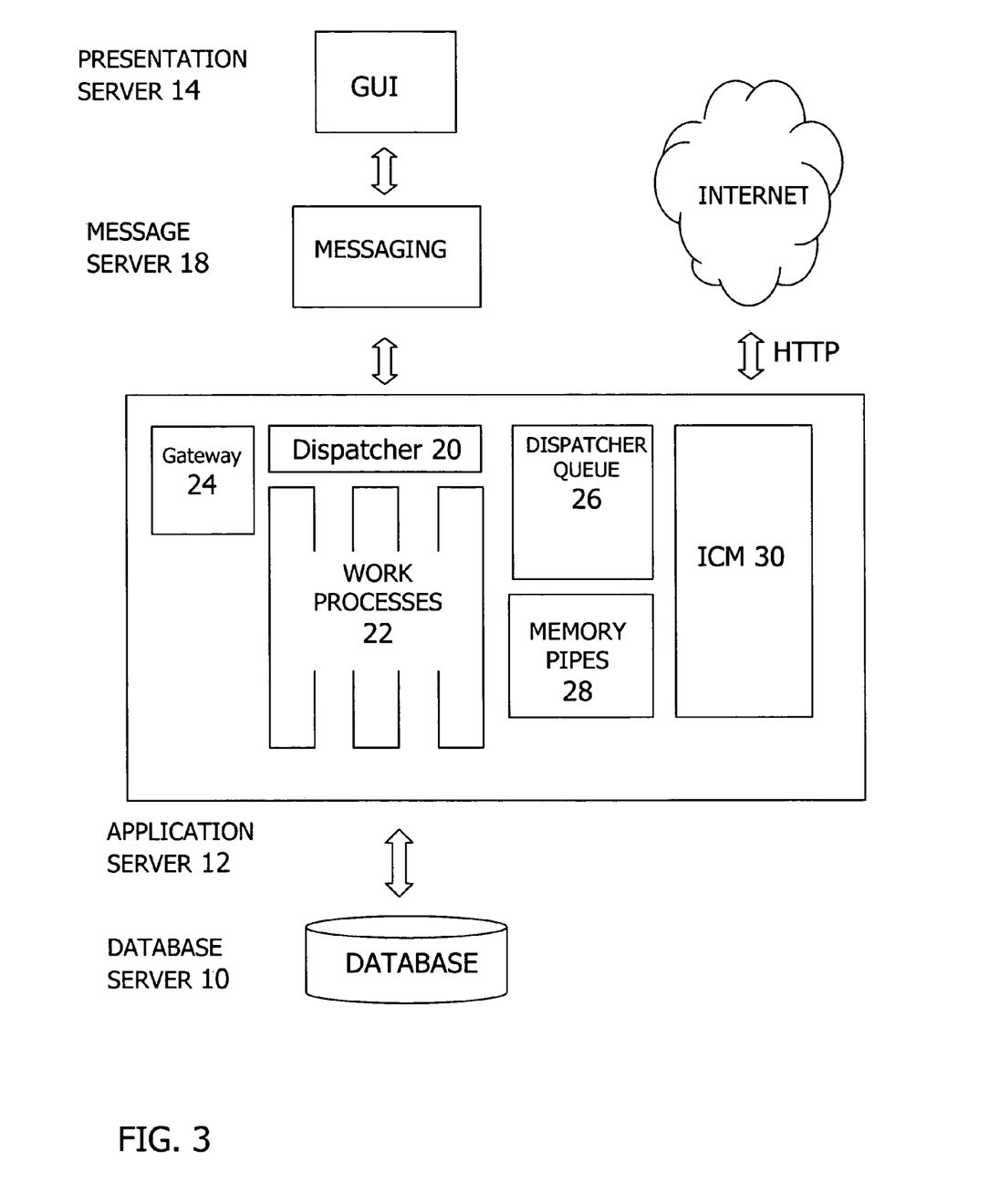
FIG. 3 is a schematic diagram illustrating a software-oriented view of a three-tiered client/server configuration of the system depicted in FIG. 1.

The three-tiered hardware architecture depicted in FIG. 2 is shown in FIG. 3 in a software-related view. As becomes apparent from FIG. 3, the software components used in context with the present invention include a GUI installed on the presentation server 14 of FIG. 2 and an application that runs on the application server 12. The application has interfaces to the database installed on database servers 10, to the Internet and, via the messaging component installed on a message server 18, to the GUI. The message server 18 is a service used by different application servers 12 to exchange data and internal messages. The main tasks of the message server 18 include the transfer of messages and the distribution of workload between individual application servers 12.

The application running on the application server 12 includes a dispatcher 18 interfacing the message server 18 and one or more presentation servers 14 on the one hand and a plurality of parallel workflows 22 on the other hand. Each workflow process 22 has an interface to the database on the database server 10. Furthermore, a gateway 24 is provided that may either be installed, from a hardware point of view, on the application server 12 or on a dedicated gateway server (not shown). The gateway service provided by the gateway 24 allows for a communication between different applications using the CPIC protocol. The function of the gateway 24 is to exchange large amounts of data between application servers, in contrast to the message server 18 which only exchanges brief internal and control messages. The application component depicted in FIG. 3 further includes dispatcher queues 26, memory pipes 28 and an Internet Communication Manager (ICM) 30, interfacing the Internet.

In the following the interrelation among the individual software components depicted in FIG. 3 is described in more detail.

As data is entered in the presentation server 14 (or otherwise generated), the data is received by the GUI, converted to a standard format, and sent via the messaging server 18 to the dispatcher 20. The connection between the GUI on the presentation server 14 and the dispatcher 20 is made with a protocol like DIAG, according to which small data packages are sent through the network 190 depicted in FIG. 1.

The dispatcher 20 checks whether there are available work tasks for processing the request received from the GUI. A workflow typically involves a plurality of such work tasks. If no work tasks are available, the request is kept together with other requests in the dispatcher queues 26 until a work task becomes available.

Once a work task becomes available, the dispatcher 20 sends the user data to the available work process 22. A work process 22 is a program in charge of executing application tasks of the present invention. Each work process 22 acts as a specialized system service. From the point of view of an operating system, a group of parallel work process 22 as depicted in FIG. 3 makes up a runtime system. Each individual work process 22 includes a task handler, a processor, and a database interface (not shown).

The work process 22 may execute dialogue steps for the presentation server 14. These steps generally relate to the processing or display of a single GUI screen, which means that right after one work process 22 finishes the execution of a dialogue step for a user session, it is immediately available for use by another user session. For its processing, each dialogue step needs code, dictionary objects, and data. These elements may come from the database residing on the database servers 10 or from an internal memory of the application server 12. Within a dialogue step, the task handler (not shown) is in charge of assigning the corresponding tasks to the internal components (dialogue interpreter and processor), finally sending a SQL request to the database servers 10. The database servers 10 send the requested data back to the work process 22, which in turn process it and passes it via the dispatcher 20 to the presentation server 14. The GUI on the presentation server 14 formats the requested data and builds up the screen for the user.

If during a particular work process 22 application data has to be exchanged with other applications such as legacy applications or external applications, the functionality of the gateway 24 is activated.

The ICM 30 allows the direct processing of HTTP requests coming from the Internet and/or a browser running on a presentation server 14, and for sending HTTP requests as HTTP client requests to the Internet. The ICM 30, which may be configured as a dedicated kernel process, uses threads to communicate as a server or as a client on the Internet. If an HTTP request is being processed by a work process 22, the memory pipes 28 are used for data transfer. The memory pipes 28 are located in a shared memory portion. In its Web client position a work process 22 creates an HTTP request which is sent to a Web server. It then receives the HTTP response and the work process 22 proceeds on the basis of the HTTP response.

Figure 4:
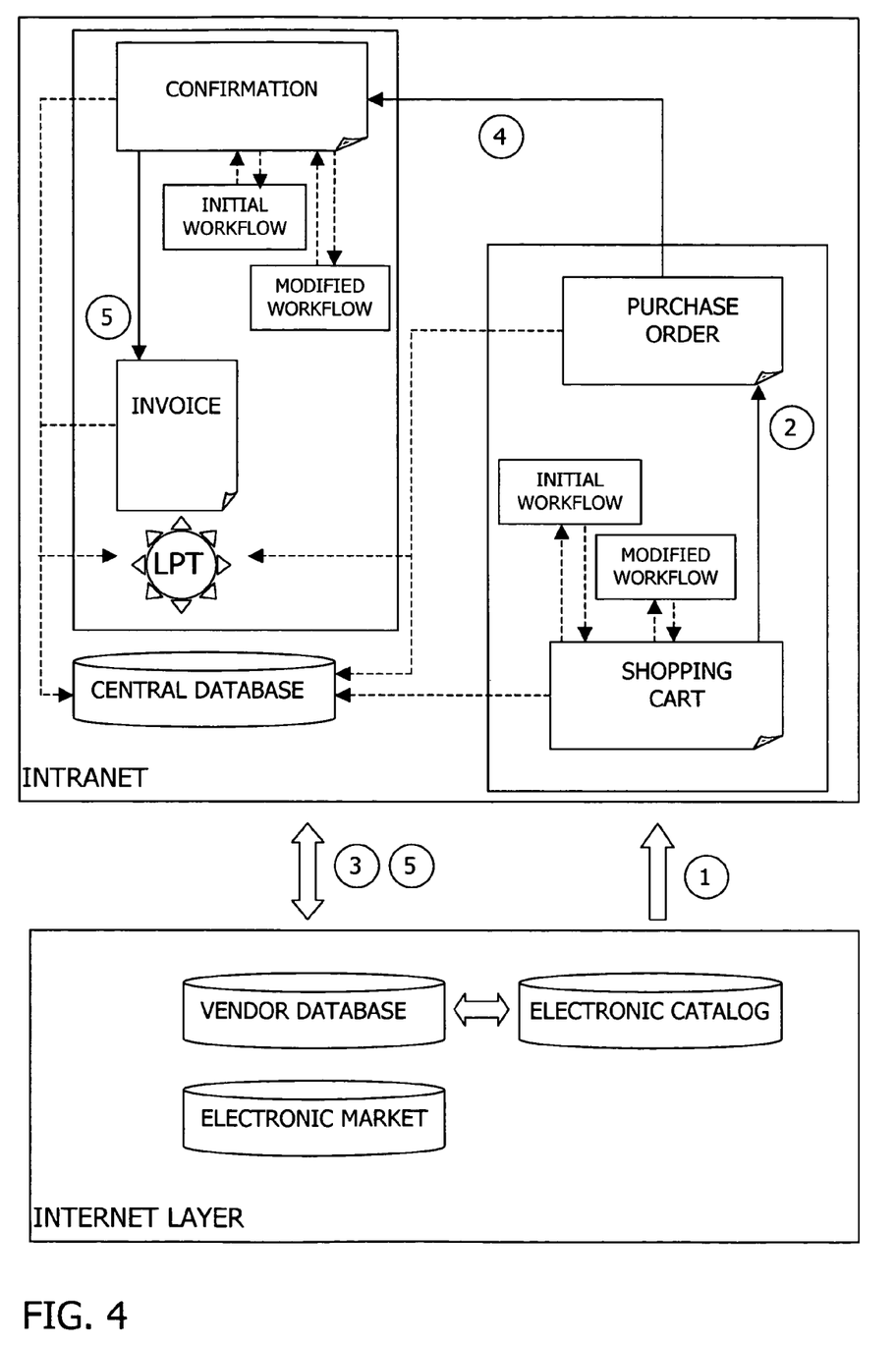
FIG. 4 is a schematic diagram illustrating an exemplary data set-related process including the consecutive creation of data sets.

The basic steps constituting an example of an electronic procurement process involving a plurality of individual workflows (and corresponding work processes 22) and a plurality of network components as described with reference to FIGS. 1 to 3 are depicted in FIG. 4.

The process starts with an electronic requirement request to create a shopping cart data set (or simply "shopping cart"). Then, a follow-on data set in the form of a purchase order data set (or simply "purchase order") is created, and if desired, a status and tracking query is formulated. A consecutive follow-on data set in the form of a goods and services receipt data set (or simply "confirmation") follows. Generation of a final follow-on data set, in the form of an invoice data set (or simply "invoice"), electronic invoice approval and payment complete the process.

As is illustrated in FIG. 4, the entities involved in the electronic procurement process include a company's intranet, as well as an Internet layer attached to the intranet as has been explained with reference to FIG. 3. The intranet basically includes presentation services, message services, application services, and database services while the Internet layer includes Internet transaction services and web services for hosting various databases like an electronic catalog and a vendor database as well as for providing an electronic marketplace. The electronic marketplace focuses on the efficiency of virtual communities and provides a collaborative platform that enables electronic procurement to take place across multiple software systems and services. The electronic marketplace provides the necessary infrastructure for virtual markets, allowing multiple organizations to electronically communicate with the purpose of conducting collaborative processes. A network component located in the intranet of FIG. 4 can access the electronic marketplace for example to publicly post a request for quotation (RFQ) for certain materials or services. Once the request is posted, bidding on the request may be performed. Once a bid is accepted, all necessary data sets (like purchase orders, invoices, etc.) are transferred via the electronic marketplace thereby forming a closed-loop scenario.

In a first step of the electronic procurement process depicted in FIG. 4, a shopping cart is created by searching the electronic catalog. The electronic catalog is regularly updated and allows real-time pricing and availability checking for goods or services to be ordered. Updating of the electronic catalog is performed via the vendor database. It should be noted that the electronic catalog may partially or completely be located in a central database of the intranet. Instead of or in addition to using the electronic catalog, requirements may be entered directly on a GUI of a presentation server located in the intranet (not shown) and transferred to the shopping cart.

A shopping cart may include only a single data item (e.g., product category) or a plurality of data items in the case of complex orders. Additionally, each shopping cart includes a header with general data (time stamp, denomination, etc.) and a follow-on data set table. The follow-on data set table contains all follow-on data set records for the shopping cart or references to these records. As a result, the individual processing stages are documented and dependencies are saved.

Once a shopping cart has been created, the requirements comprised therein may be held or ordered. When holding the requirements, the shopping cart is temporarily stored locally and can be processed again at a later time. When the user wishes to initiate the next processing stage (ordering), including creation of a follow-on data set in the form of a purchase order, (depending on whether the shopping cart was processed in a collaborative workflow to manipulate its initial status and depending on its final status as described in more detail below) the application server (not shown) checks whether the shopping cart needs to be approved.

Generally, a requirement request (shopping cart) must have a predefined approval status before a purchase order can be created. For status manipulation purposes, the application server initiates a Web-compatible collaborative workflow. Approval status manipulation can be carried out using an automated release strategy without routing the shopping cart through the intranet (initial or standard workflow) or, for example if the requisition value is above a predefined threshold allowed for automatic approval, and in dependence of the result of a stochastic process, the approval status can be manipulated in the course of a modified workflow as will be described in more detail below.

If a shopping cart has assumed the required approval status or if it is determined that no approval is required, the system automatically creates the purchase order as follow-on data set (step 2). Both the shopping cart and the purchase order are stored in the central database of the intranet. On creation of the purchase order, a reference to this follow-on data set is written in the follow-on data set table of the shopping cart. By this, the purchase order is associated with the shopping cart. It should be noted that two or more individual purchase orders may be created for a single shopping cart. This may be the case for example if different data items (goods/services) of the shopping cart are ordered from different vendors.

Once a purchase order has been created, it is sent electronically via the Internet to the vendor's system using for example XML. Other messaging protocols and messaging services like e-mail or EDI may be used also. As an alternative to sending the purchase order to a particular vendor, it may also be placed on the electronic marketplace as mentioned above (step 3).

After the goods have been delivered or after the services have been performed, a confirmation data set is created (step 4). Before the final follow-on data set (invoice) can be created, the confirmation data set must have an approved status. For status manipulating purposes, a web-compatible collaborative workflow is initiated. Depending on the start conditions fulfilled by the confirmation data set and depending on the result of a stochastic process that will be described in more detail below, status manipulation is carried out using either an initial (or standard) workflow or a modified workflow.

Once the confirmation has been created, a reference to this follow-on data set is written in the follow-on data set table of the shopping cart. Additionally, the confirmation is stored in the central database of the intranet and, if required, printed by printer LPT. It should be noted that for a single purchase order two or more confirmations may be created, for example when the ordered goods are received with different deliveries. In such a case a first confirmation is created for the initial delivery and one or more further confirmations are created for the amount of goods still open after the first delivery.

In a fifth step, a final follow-on data set in the form of an invoice is created by the vendor's system and transferred for example by XML to the intranet where it is stored in the central database. At the same time a reference to this newly created follow-on data set is written in the follow-on data set table of the shopping cart and a collaborative approval workflow may started as discussed above (not depicted). If required, the invoice may be printed using the printer LPT.

It should be noted that in principle, the invoice may also be created within the intranet. On the other hand, the confirmation need not necessarily be created within the intranet but may be created by the vendor's system and transferred to the intranet via the Internet layer.

As has become apparent from the above, the electronic procurement process described with reference to FIG. 4 involves the distributed handling of a plurality of data sets including an initial data set (shopping cart) and three independent follow-on data sets (purchase order, confirmation, invoice).

Two of the four data sets shown in FIG. 4 are subjected to collaborative workflows that relate to a manipulation of approval status information associated with(e.g., written in a data field of) the respective data set. As has become apparent from the above, the approval status information controls the subsequent creation of follow-on data sets. If, for example, the status of the initial data set (shopping cart) is not changed from "pending approval" to "approved", no follow-on data set (purchase order) is created for this initial data set. Manipulation of the approval status is performed during a generally collaborative approval workflow involving one or more network components (e.g., a network component requesting approval and one or more approving network components).

In the present embodiment, there is no fixed collaborative approval workflow that is applied to all types of data sets or to all data sets of a particular type. Rather, an appropriate workflow is dynamically (and stochastically) chosen by an arrangement having the structure shown in FIG. 5 and operating in accordance with a workflow-replacing process as shown in FIG. 6.

Figure 5:
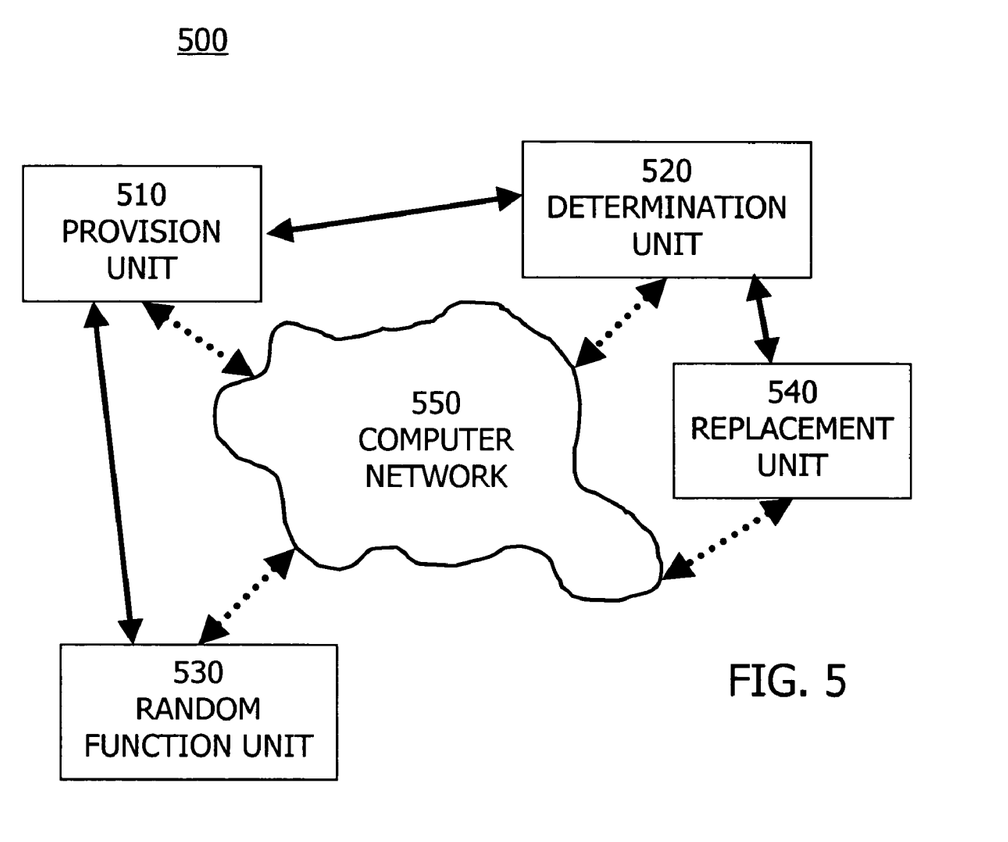
FIG. 5 is a schematic diagram illustrating a computer network component in accordance with the present invention.
Figure 6:
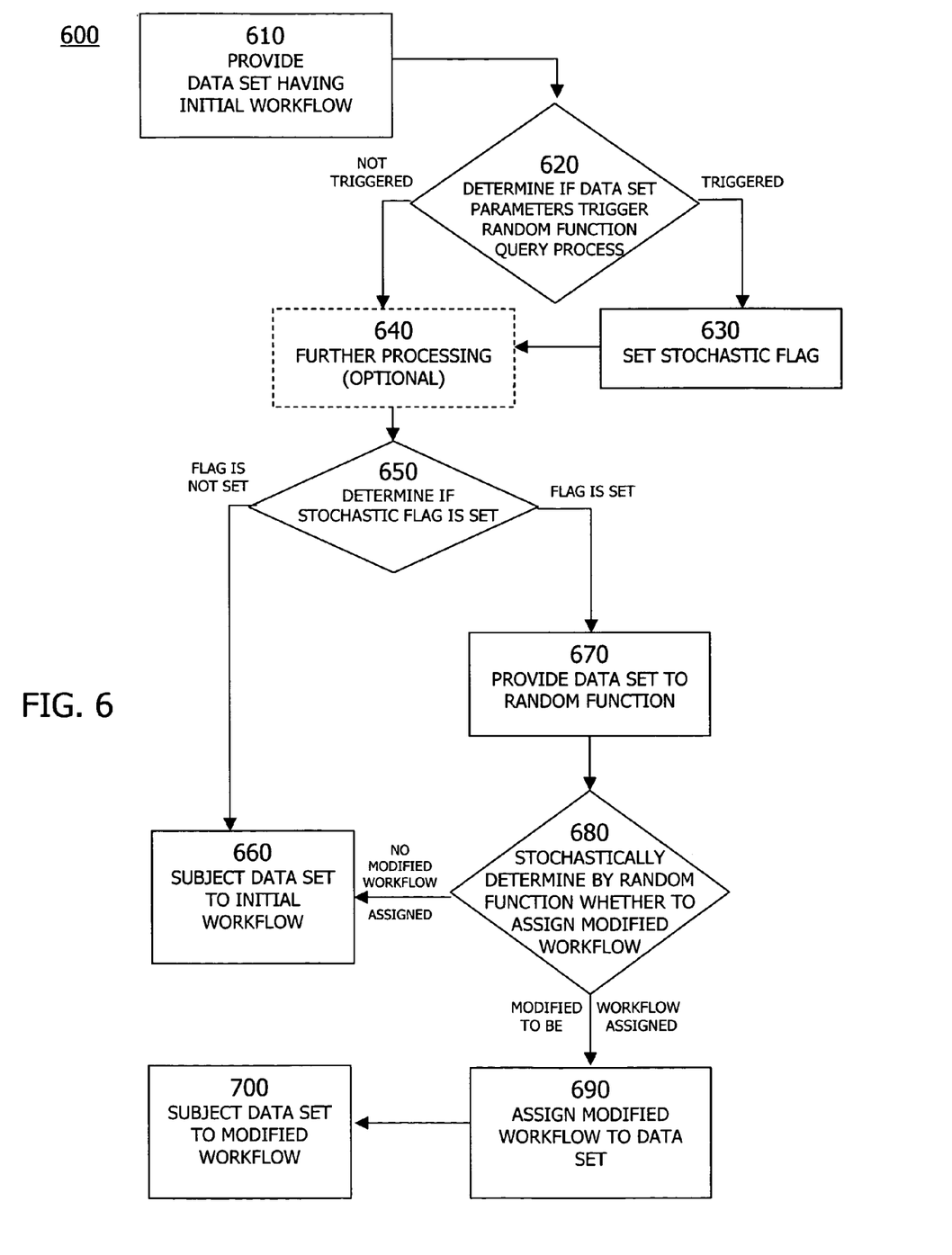
FIG. 6 is a flowchart diagram illustrating a workflow-replacing process in accordance with the present invention.

With reference to FIG. 5, an arrangement 500 for handling data sets that are to be subjected to one or more stages of a collaborative workflow is illustrated. The arrangement 500 includes a provision unit 510, a determination unit 520, a random function unit 530 and a replacement unit 540. The individual units 510, 520, 530 and 540 can belong to a single physical network component (and communicate directly with each other) or can be distributed across several individual network components (and communicate with each other via a computer network 550).

The provision unit 510 provides the data set that is to be subjected to a status manipulating workflow. The data set provided by the provision unit 510 is already associated with an initial (or standard) workflow. The determination unit 520 determines if the data set provided by the provision unit 510 satisfies a set of one or more start conditions to trigger a random function query and provides the data set, via the provision unit 510, to the random function unit 530 if the random function query is triggered. The random function unit 530 then stochastically determines whether or not to assign a modified workflow to the data set. Should the random function unit 530 decide to assign the modified workflow (instead of the initial workflow) to the data set provided by the provision unit 510, it controls the replacement unit 540 such that the initial workflow is replaced with a modified workflow. Once the initial workflow has been replaced with a modified workflow, the data set is subjected to the modified workflow. On the other hand, if it has stochastically been determined not to assign a modified workflow to the data set, or if the data set does not satisfy any set of start conditions to trigger a random function query, the data set is subjected to the initial workflow.

The process of stochastically replacing the initial workflow with a modified workflow will now be described in more detail with reference to the process flow diagram 600 shown in FIG. 6. The process flow diagram 600 illustrates a technique for stochastically handling data sets generated by a system or process as described above (or otherwise), such as the shopping cart and confirmation data sets of FIG. 4. It will be appreciated by the skilled artisan from the following that the present invention may be utilized in any arrangement in which data sets are created that may be subjected to a status manipulating workflow, and in which there is benefit from reducing the number of data sets that must be routed to status manipulating network components (while at the time maintaining the integrity and quality of the status manipulations).

The method starts in step 610 with the provision of a data set to which an initial (or standard) workflow has been assigned depending on a particular set of start conditions satisfied by the data set. To this end various sets of start conditions are defined and each set of start conditions is associated with a particular initial workflow. The start conditions that are evaluated to assign a particular initial workflow to the data set are kept simple and may, for example, depend only on the particular data set type provided. In the example shown in FIG. 4, a first initial workflow may be provided for the data set type "shopping cart" and a second initial workflow may be provided for the data set type "confirmation". Keeping the start conditions such simple reduces the processing resources required to evaluate the start conditions and to assign, depending on the start conditions, an initial workflow to the data set. In the present embodiment, the initial workflow involves a local status manipulation stage that does not require any routing of the data set to other network components (or network addresses). Accordingly, the initial workflow, if not replaced by a modified workflow, helps to reduce network traffic as the status manipulation does not involve any routing processes.

Once an initial workflow has been assigned to the data set in step 610, it is determined (in step 620) if parameters associated with (e.g., included in) the data set trigger a random function query process. Specifically, it is determined if the data set satisfies one or more further start conditions (that will in general be different from the start conditions evaluated when assigning the initial workflow to the data set in step 610). The start conditions evaluated in step 620 may include the initial workflow assigned to the data set in step 610, a workflow event (e.g., if the data set has been or will be saved, etc.), a data set type, a data set sub type and/or one or more threshold values relating to values included in the data set.

If it is determined in step 620 that the data set provided in step 610 satisfies any one predefined set of start conditions, it is decided to trigger a random query, and a stochastic flag included in the data set is set in step 630. If, on the other hand, it is determined in step 620 that the data set does not satisfy any predefined set of start conditions, the stochastic flag is not set (or remains un-initialized).

From step 630 or, if no random function query process is triggered, from step 620, the method proceeds with an optional step 640 in which the data set may be processed further. If no further processing is required, step 640 may be omitted and the method may continue directly with step 650. In step 650 it is determined if the stochastic flag of the data set is set. If the stochastic flag is not set, the data set is subjected to the initial workflow in step 660.

If, however, it is determined in step 650 that the stochastic flag is set, the data set is provided to the random function process (step 670). In the random function process (step 680) it is stochastically determined by a random function whether or not to assign a modified workflow to the data set. To this end, one or more stochastic parameters associated with particular the start conditions already evaluated in step 620 are retrieved. The stochastic parameters retrieved by the random function may be a single percentage value indicative of the percentage with which the initial workflow is to be replaced with a modified workflow.

After the one or more stochastic parameters have been retrieved, the random function starts a random generator and compares a random value output by the random generator with the one or more stochastic parameters to stochastically determine whether or not to assign a modified workflow. If, for example, the stochastic parameter is chosen within a range of 0 to 1 (0.1, for example, indicating that for ten percent of all data sets the initial workflow is to be replaced by a modified workflow), and if the random generator generates random values in the range between 0 and 1, it is determined to replace the initial workflow with a modified workflow if the random value output by the random generator lies in the range between 0 and 0.1. If, on the other hand, the random value lies in the range above 0.1, the initial workflow is not replaced. In this case no modified workflow need to be assigned to the data set and the method continuous with step 660 in which the data set is subjected to the initial workflow.

If it is stochastically determined in step 680 that a modified workflow need to be assigned to the data set, the method continuous with step 690. In step 690 a modified workflow is determined for the data set dependent on the start conditions satisfied by this data set. As explained above, these start conditions were already evaluated in step 620. After the appropriate modified workflow associated with the start conditions evaluated in step 620 has been determined and assigned to the data set, the method continues with step 700. In step 700 the data set is subjected to the modified workflow that has been assigned to the data set in step 690.

The skilled artisan will appreciate that the stochastic parameters utilized by the random function in step 680 are fixed but may be adjustable. For example, the percentage range indicative of the probability that the initial workflow will be replaced with the modified workflow may be adjusted such that the number of data sets subjected to the initial workflow or to a particular modified workflow fulfills a certain condition (e.g., does not exceed or fall below a predefined value during a predefined time interval).

Figure 8:
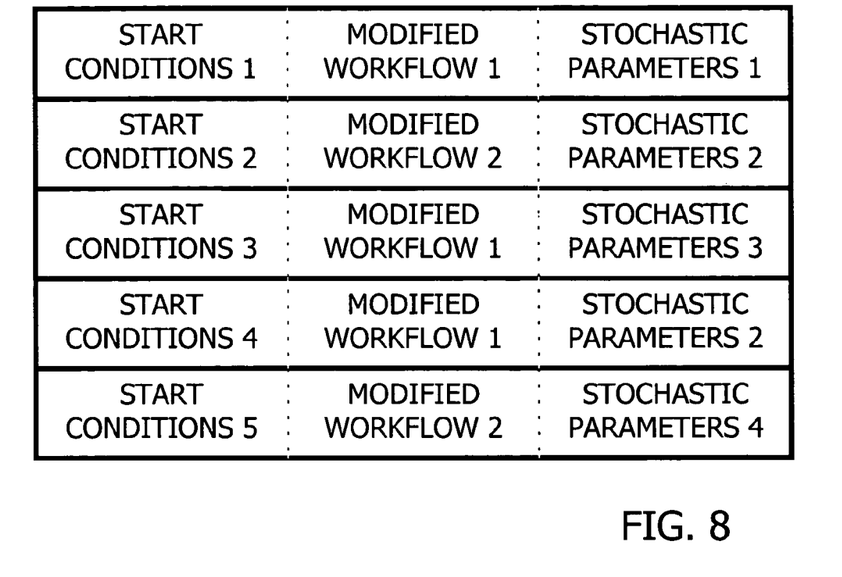
FIG. 8 is a schematic diagram illustrating the association between start conditions, modified workflows and stochastic parameters according to the present invention.

The skilled artisan will appreciate further that it is not required that the start conditions initiating the stochastic process are evaluated in each of steps 620, 680 and 690. Instead, an identifier pointing to the particular set of start conditions satisfied by the data set evaluated in step 620 (or to the modified workflow assigned to these particular conditions) may be associated with (e.g., written in a data field of) the data set in step 620. This identifier may then be used in step 680 to retrieve the one or more stochastic parameters assigned to the start conditions and in step 690 to identify the modified workflow that is to be assigned to the data set using, for example, a look-up table similar to that shown in FIG. 8. As shown in FIG. 8 (that will be explained in more detail below), the identifier may, for example, be one of the consecutive numbers assigned to the individual sets of start conditions (i.e., 1, 2, 3, 4 or 5 in the embodiment shown in FIG. 8).

Figure 7:
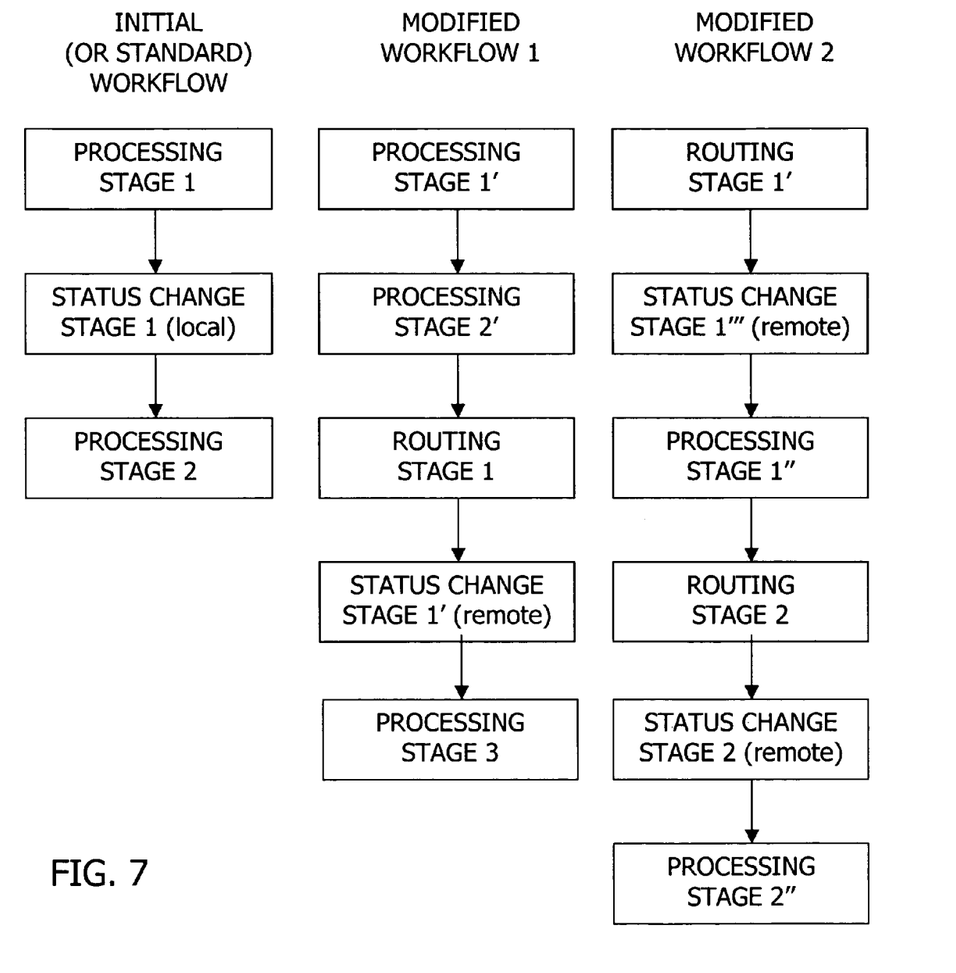
FIG. 7 is a schematic diagram illustrating various workflows in accordance with the present invention.

FIG. 7 schematically shows a single initial (or standard) workflow that may be assigned to a data set, and a set of two modified workflows that may replace the initial workflow. The workflows shown in FIG. 7 may be implemented in context with the embodiments explained above with reference to FIGS. 4 to 6.

The initial workflow includes three individual stages, a first processing stage, a first status change stage, and a second processing stage. The individual stages of the initial workflow are all performed by one and the same computer network component. The single status change stage is configured such that the status information is automatically manipulated. This could mean in the above embodiments that in the standard workflow the approval status is automatically changed from "pending approval" to "approved", so that any dialogue-type communications can be omitted and the data set can quickly traverse the individual stages of the standard workflow.

The modified workflow includes five stages, two local processing stages, a routing stage, a remote status change stage as well as a (local or remote) third processing stage. In the routing stage, the data set is routed to a remote network component for status manipulation purposes (if appropriate together with a status manipulation request). At the remote network component, status manipulation processes are performed. This status manipulation processes may include an automatic status change (e.g., from "pending approval" to "approved"). Alternatively, a semi-automatic status change process involving dialogue-type communications and user input may be performed.

The second modified workflow shown in FIG. 7 involves six individual stages, including two routing stages and two remote status change stages. The routing stages may performed in series (as shown in FIG. 7) or in parallel. During the two routing stages the data set is sent to the same as to different network components for status change purposes as explained above.

Obviously, the second modified workflow causes more network traffic than the first modified workflow, whereas the standard workflow does not cause any network traffic. Additionally, the standard workflow occupies less processing resources than any of the modified workflows. Accordingly, the standard workflow is, from a technical point of view, the preferred workflow. However, the standard workflow has the drawback that no detailed review intervention with respect to the data set to be approved takes place. For this reason, the standard workflow is stochastically replaced by one of the first and second modified workflow to ensure that errors like wrong data input and the like can statistically be detected. Compared to the situation that only modified workflow 1 and/or modified workflow 2 are implemented, the stochastic combination of the initial workflow with any one of the modified workflows on the average decreases system occupancy and network traffic.

Figure 9:
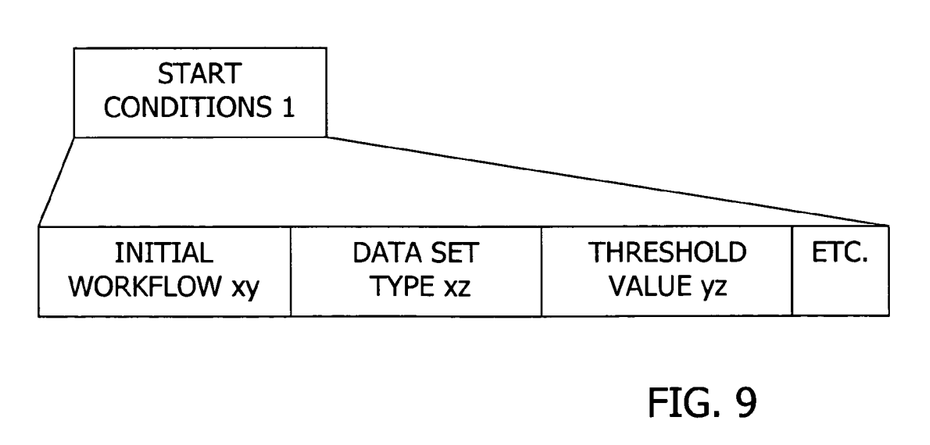
FIG. 9 is a schematic diagram illustrating various start conditions in accordance with the present invention.

FIG. 8 shows a table associating each of five different sets of start conditions with a corresponding modified workflow and corresponding stochastic parameters. With reference to FIG. 6, the table of FIG. 8 is read in step 620 to evaluate the start conditions and to determine whether or not to set the stochastic flag, in step 680 to read the appropriate stochastic parameters, and in step 690 to identify the modified workflow that is to replace the initial workflow. As shown in FIG. 9, the start conditions may relate to initial workflow, the data set type, one or more threshold values, etc.

Although embodiments of the present invention have been illustrated in the accompanying drawings and described in the foregoing description, it will be understood that the invention is not limited to the embodiments disclosed. The invention is capable of numerous rearrangements, modifications and substitutions without departing from the spirit of the invention as set forth and defined by the following claims.

What is claimed is:

1. A method of handling a data set subjected to at least one stage of a collaborative workflow executed in a computer network connecting a plurality of computer network components having network addresses, wherein the collaborative workflow relates to a manipulation of status information associated with the data set and wherein the status information controls the processing of at least one of the data set itself and of an associated data set, the method comprising the steps of:
   providing a data set having an initial workflow;
   determining whether the data set satisfies a first set of start conditions, wherein each start condition in the first set of start conditions is associated with one or more stochastic parameters;
   providing the data set to a random function based on the determination;
   stochastically determining, by the random function, whether to assign a modified workflow to the data set, wherein the stochastic determination is controlled by the one or more stochastic parameters; and
   replacing the initial workflow with the modified workflow for the data set based on the stochastic determination.

2. The method of claim 1, further comprising the step of selecting the modified workflow out of a predefined set of workflows.

3. The method of claim 2, wherein the modified workflow is selected based on the first set of start conditions satisfied by the data set.

4. The method of claim 1, further comprising the step of automatically adjusting the one or more stochastic parameters.

5. The method of claim 4, further comprising the step of monitoring the number of workflow replacements and adjusting the one or more stochastic parameters based on the number of workflow replacements.

6. The method of claim 5, wherein the one or more stochastic parameters are adjusted such that a predefined number of workflow replacements is attained.

7. The method of claim , further comprising the step of manipulating a stochastic identifier associated with the data set if the data set satisfies one set of first start conditions.

8. The method of claim 7, wherein the stochastic identifier controls the process of subjecting the data set to the random function.

9. The method of claim 1, wherein the initial workflow includes an automatic manipulation of the status information and the modified workflow includes a semi-automatic manipulation of the status information.

10. The method of claim 1, wherein the modified workflow includes the step of routing at least a part of the data set to a network address together with a status manipulation request.

11. The method of claim 1, wherein the first set of start conditions relate to at least one of the initial workflow, a threshold value, a workflow event, a data set type and a data set sub-type.

12. The method of claim 1, wherein the initial workflow or the modified workflow precedes and controls the generation of a follow-on data set for the data set subjected to the workflow.

13. The method of claim 1, wherein the workflows control the routing of at least a part of the individual data sets to a network address.

14. The method of claim 13, wherein the workflows differ in the number of routing processes involved in the network addresses to which at least a part of the data sets are routed.

15. The method of claim 1, further comprising the step assigning the initial workflow to the data set based on a second set of start conditions satisfied by the data set.

16. A computer program product, stored on a computer readable recording medium, configured to handle a data set subjected to at least one stage of a collaborative workflow executed in a computer network connecting a plurality of computer network components having network addresses, wherein the collaborative workflow relates to a manipulation of status information associated with the data set and wherein the status information controls the processing of at least one of the data set itself and of an associated data set, the computer code program product comprising:
    computer code that provides a data set having an initial workflow;
    computer code that determines whether the data set satisfies a set of one or more first start conditions, wherein each of the one or more first start conditions is associated with one or more stochastic parameters;
    computer code that provides the data set to a random function based on the determination;
    computer code that stochastically determines, by the random function, whether to assign a modified workflow to the data set, wherein the stochastic determination is controlled by the one or more stochastic parameters; and
    computer code that replaces the initial workflow with the modified workflow for the data set based on the stochastic determination.

17. A computer network component for controlling the handling of a data set that will be subjected to at least one stage of a collaborative workflow executed in a computer network connecting a plurality of computer network components, wherein the collaborative workflow relates to a manipulation of status information associated with the data set and wherein the status information controls the processing of at least one of the data set itself and of an associated data set, comprising:
    a provision unit configured to provide a data set having an initial workflow;
    a determination unit configured to determine whether the data set satisfies a set of one or more start conditions and configured to provide the data set to a random function unit based on the determination, wherein each of the one or more start conditions is associated with one or more stochastic parameters;
    a random function unit configured to stochastically determine whether to assign a modified workflow to the data set, wherein the stochastic determination is controlled by the one or more stochastic parameters; and
    a replacement unit configured to replace the initial workflow with the modified workflow for the data set based on the stochastic determination.

18. An apparatus for controlling the handling of a data set that will be subjected to at least one stage of a collaborative workflow executed in a computer network connecting a plurality of computer network components, wherein the collaborative workflow relates to a manipulation of status information associated with the data set and wherein the status information controls the processing of at least one of the data set itself and of an associated data set, comprising:
    a provision unit configured to provide a data set having an initial workflow;
    a determination unit configured to determine whether the data set satisfies a set of one or more start conditions and configured to provide the data set to a random function unit based on the determination, wherein each of the one or more start conditions is associated with one or more stochastic parameters;
    assignation means for randomly determining whether to assign a modified workflow to the data set, wherein the random determination is controlled by the one or more stochastic parameters; and
    a replacement unit configured to replace the initial workflow with the modified workflow for the data set based on the random determination.

19. A system for handling a data set subjected to at least one stage of a workflow requiring, the system comprising:
    first provision means for providing a data set having an initial workflow;
    first determination means for determining whether the data set satisfies a set of one or more first start conditions, wherein each of the one or more first start conditions is associated with one or more stochastic parameters;
    second provision means providing the data set to a random function based on the determination;
    second determination means for randomly determining, by the random function, whether to assign a modified workflow to the data set, wherein the random determination is controlled by the one or more stochastic parameters; and
    replacement means for replacing the initial workflow with the modified workflow for the data set based on the random determination.

20. A method of handling a data set subjected to at least one stage of a workflow, the method comprising the steps of:
    providing a data set having an initial workflow;
    determining whether the data set satisfies a set of one or more first start conditions, wherein each of the one or more first start conditions is associated with one or more stochastic parameters;
    providing the data set to a random function based on the determination;
    stochastically determining, by the random function, whether to assign a modified workflow to the data set, wherein the stochastic determination is controlled by the one or more stochastic parameters;
    replacing the initial workflow with the modified workflow for the data set based on the stochastic determination; and
    providing the data set to one or more approval agents to obtain approval of the data set.

21. The method of claim 1, wherein each workflow precedes or controls the generation of a follow-on data set for the data set subjected to the workflow.

22. The method of claim 13, wherein the workflows differ in the number of routing processes involved or in the network addresses to which at least a part of the data sets are routed.

23. A method of handling a data set subjected to at least one stage of a collaborative workflow executed in a computer network connecting a plurality of computer network components having network addresses, wherein the collaborative workflow relates to a manipulation of status information associated with the data set and wherein the status information controls the processing of at least one of the data set itself and of an associated data set, the method comprising the steps of:
   providing a data set having an initial workflow;
   deterimining whether the data set satisfies a set of one or more first start conditions to trigger a random function query, wherein each of the one or more first start conditions is associated with one or more stochastic parameters;
   providing the data set to a random function based on the random function query being triggered;
   stochastically determining, by the random function, whether to assign a modified workflow to the data set, wherein the stochastic determination is controlled by the one or more stochastic parameters; and
   replacing the initial workflow with the modified workflow for the data set based on the stochastic determination.

24. A method of handling a data set subjected to at least one stage of a collaborative workflow executed in a computer network connecting a plurality of computer network components having network addresses, wherein the collaborative workflow relates to a manipulation of status information associated with the data set and wherein the status information controls the processing of at least one of the data set itself and of an associated data set, the method comprising the steps of:
   providing a data set having an initial workflow;
   determining whether the data set satisfies a set of one or more first start conditions;
   providing the data set to a random function based on the determination, wherein the random function provides a stochastic parameter based on the one or more first start conditions;
   generating a random value output;
   comparing the stochastic parameter with the random value output to determine whether to assign a modified workflow to the data set; and
   replacing the initial workflow with the modified workflow for the data set based on the comparison.

* * * * *